(12) United States Patent
Phan et al.

(10) Patent No.: US 8,055,719 B2
(45) Date of Patent: Nov. 8, 2011

(54) PERFORMANCE AND REDUCE NETWORK TRAFFIC FOR REMOTE HARDWARE DATA SCAN OPERATIONS

(75) Inventors: Christopher Tung Phan, Rochester, MN (US); Thi Ngoc Tran, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 12/173,846

(22) Filed: Jul. 16, 2008

(65) Prior Publication Data

US 2010/0017477 A1    Jan. 21, 2010

(51) Int. Cl.
*G06F 15/16* (2006.01)
(52) U.S. Cl. ...................................... 709/206
(58) Field of Classification Search .............. 726/25, 726/24, 23, 22, 2; 709/245, 236, 230, 227, 709/224, 217, 206, 203, 223, 221, 216, 204; 370/474, 338, 328, 400, 395.4; 707/758, 707/754, 741, 719
See application file for complete search history.

(56) References Cited

U.S. PATENT DOCUMENTS

| | | | |
|---|---|---|---|
| 5,168,555 A | 12/1992 | Byers et al. | |
| 7,225,281 B2 | 5/2007 | Rosenbluth et al. | |
| 7,269,179 B2 | 9/2007 | Wolrich et al. | |
| 7,299,346 B1 | 11/2007 | Hollis | |
| 7,302,549 B2 | 11/2007 | Wilkinson, III et al. | |
| 7,447,761 B1 * | 11/2008 | Ferguson et al. | 709/224 |
| 2004/0128370 A1 * | 7/2004 | Kortright | 709/221 |
| 2006/0235983 A1 * | 10/2006 | Layman et al. | 709/227 |
| 2006/0245431 A1 * | 11/2006 | Morris | 370/395.4 |

* cited by examiner

*Primary Examiner* — Asad M Nawaz
*Assistant Examiner* — Charles Murphy
(74) *Attorney, Agent, or Firm* — Yee & Associates, P.C.; David A. Mims, Jr.

(57) ABSTRACT

According to one embodiment of the present invention, multiple data scan operations are compacted into a single network message. A plurality of requests to perform a data scan operation on a remote node controller is received, forming a set of received data scan operation requests. A set of data scan operations are generated based on the set of received data scan operation requests, forming a set of generated data scan operations. A network message comprising the set of generated data scan operations is generated, forming a first compacted data scan operation network message. The first compacted data scan operation network message is sent to the remote node controller. A second compacted data scan operation network message is received from the remote node controller, wherein the second compacted data scan operation network message comprises a set of completed data scan operations. The set of completed data scan operations are separated into individual completed data scan operations. Each individual completed data scan operation is sent to the user that issued the request.

20 Claims, 8 Drawing Sheets

PERFORMANCE AND REDUCE NETWORK TRAFFIC FOR REMOTE HARDWARE DATA SCAN OPERATIONS

BACKGROUND OF THE INVENTION

1. Field of the Invention

The present invention relates generally to data processing systems and more specifically to compacting multiple data scan operations into a single network message.

2. Description of the Related Art

In multiple node distributed systems comprised of multiple service processors, whenever an application wants to scan data in or out of a chip, each such data scan operation requires a separate network transaction and some overhead time for the calls between the application and the firmware. During system initial program load, the applications request thousands of such single data scan operations to perform initialization and diagnostics on the chips in the node system. This can be a performance drain and makes the current design inefficient because of the network overhead and code latency time.

BRIEF SUMMARY OF THE INVENTION

According to one embodiment of the present invention, multiple data scan operations are compacted into a single network message. A plurality of requests to perform a data scan operation on a remote node controller is received, forming a set of received data scan operation requests. A set of data scan operations are generated based on the set of received data scan operation requests, forming a set of generated data scan operations. A network message comprising the set of generated data scan operations is generated, forming a first compacted data scan operation network message.

The first compacted data scan operation network message is sent to the remote node controller. A second compacted data scan operation network message is received from the remote node controller, wherein the second compacted data scan operation network message comprises a set of completed data scan operations. The set of completed data scan operations are separated into individual completed data scan operations. Each individual completed data scan operation is sent to the user that issued the request.

DETAILED DESCRIPTION OF THE INVENTION

Figure 1:
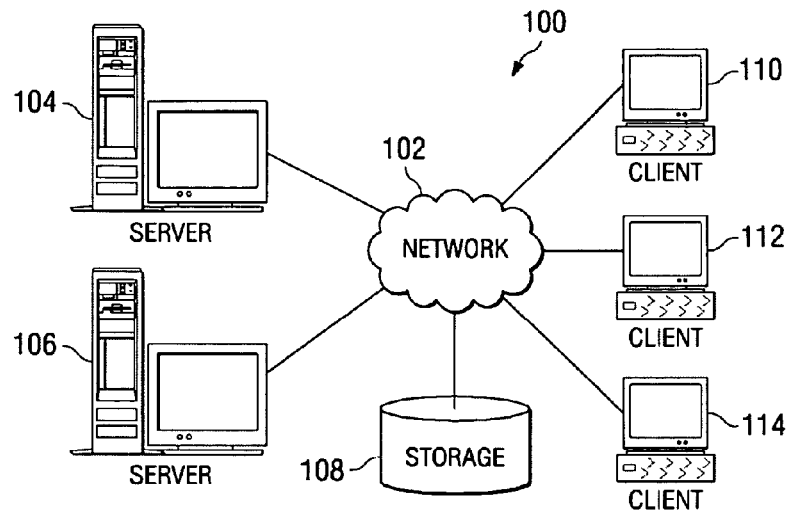
FIG. 1 depicts a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
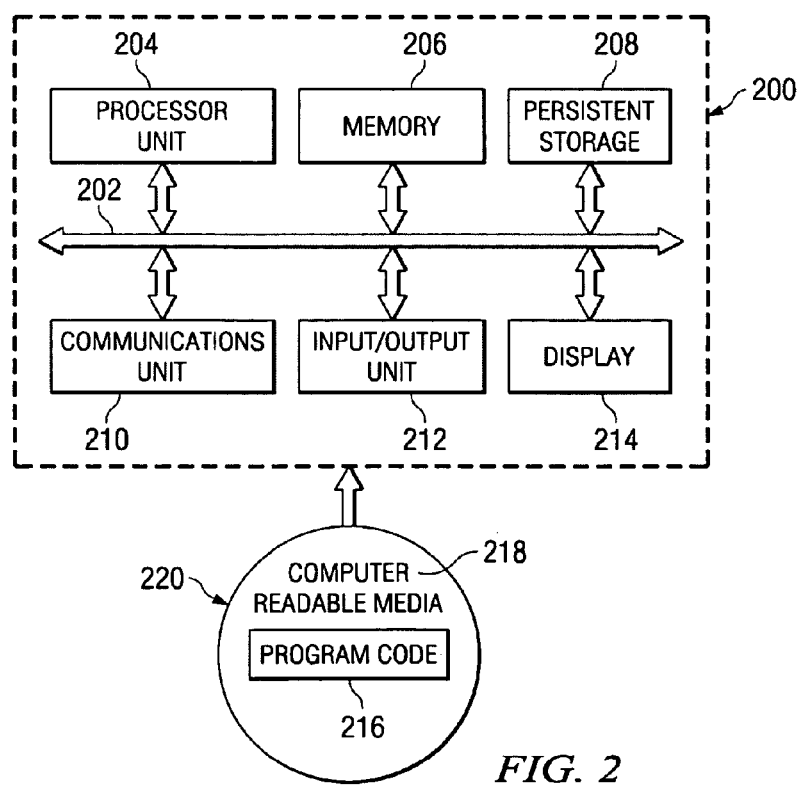
FIG. 2 is a block diagram of a data processing system is shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information on either a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
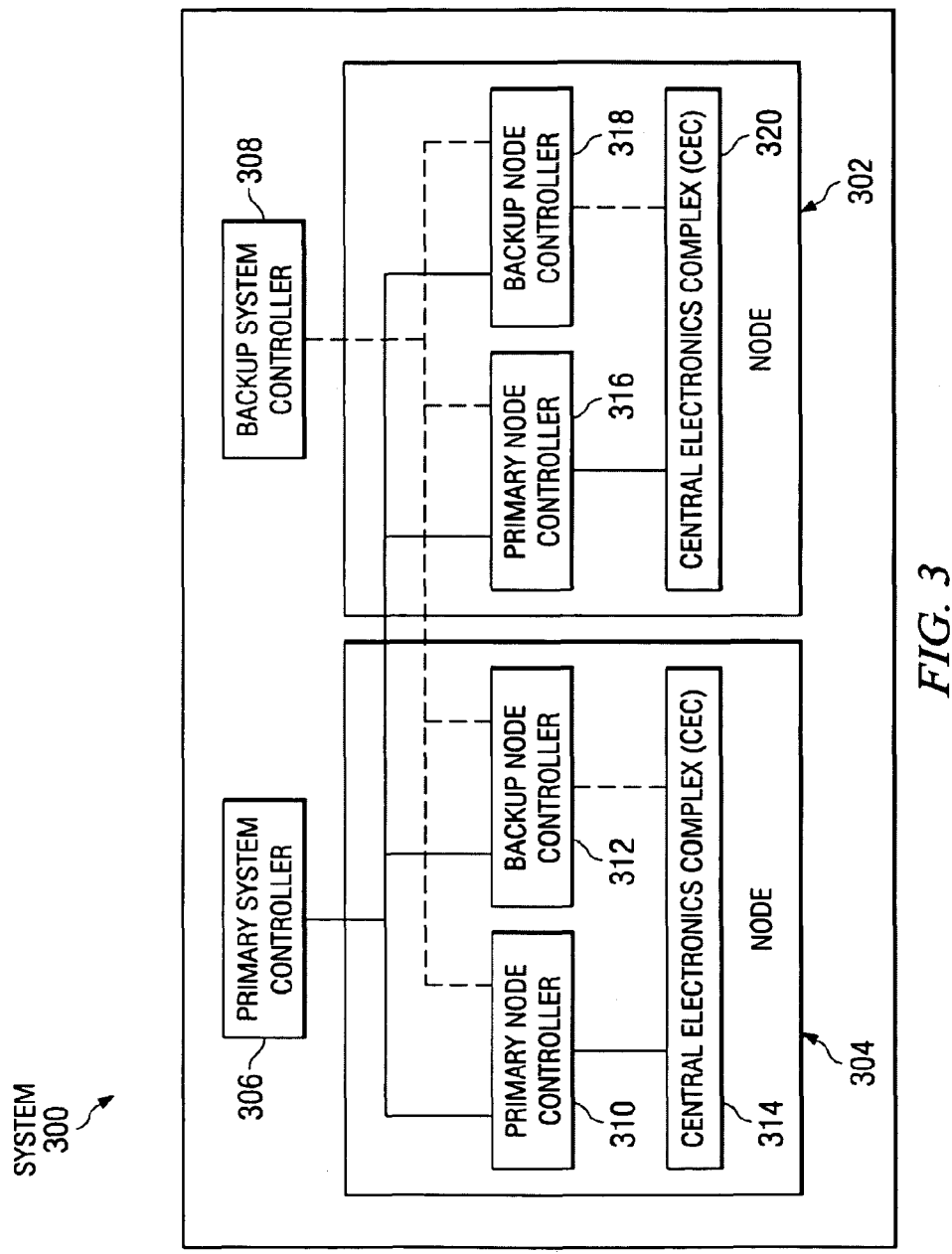
FIG. 3 is a block diagram of a multi-node system in accordance with an exemplary embodiment.

FIG. 3 is a block diagram of a multi-node system in accordance with an exemplary embodiment. System 300 comprises nodes 302 and 304, primary system controller 306, and back-up system controller 308. Nodes 302 and 304 may be implemented as part of a server, such as server 104 in FIG. 1. Primary system controller 306 and back-up system controller 308 each comprise a processor (not individually shown), such as processor unit 204 in FIG. 2. Each node has a pair of node controllers, a primary and back-up node controller. Node 302 comprises primary node controller 316, back-up node controller 318, and central electronics complex (CEC) 320. Central electronics complex (CEC) 320 comprises hardware for the node, such as a processor or other functional chipsets. Node 304 comprises primary node controller 310, back-up node controller 312, and central electronics complex (CEC) 314. Central electronics complex (CEC) 314 comprises hardware for the node, such as a processor or other functional chipsets.

Back-up system controller 308 is used if primary system controller 306 fails. Back-up node controller 312 is used if primary node controller 310 fails. Each system controller, primary system controller 306 and back-up system controller 308, is connected to each node controller, both primary and back-up node controllers in each node. Applications run on both system and node controllers. The firmware on a system controller, such as primary system controller 306, contains system scope functions that control the nodes. The firmware on a node controller, such as primary node controller 310, interfaces with the access device abstraction layer firmware, also referred to as simply the access device abstraction layer, to control the physical devices attached locally to the node. Some example of such physical devices are joint test action group (JTAG), FRU support interface (FSI), processor support interface (PSI), inter-integrated circuit (I2C), and so forth. The remote device abstraction layer firmware transfers data back and forth between system and node controllers through the system-node controller's network.

With such a system, such as system 300 in FIG. 3, when an application wants to scan data in or out of a chip in a node, the following steps will take place. First, the application calls hardware object model firmware (HOM), which is the firmware running on the system controller that encapsulates the hardware, to order the data scan, passing in scan parameters, such as data, scan address, and so forth. The hardware object model firmware verifies if the data scan is allowed based on the current state of the chip. The hardware object model firmware then retrieves the chip's remote device abstraction layer handle, which is unique information of the chip physical location, and calls the remote device abstraction layer firmware, passing in the remote device abstraction layer handle along with the scan parameters to the remote device abstraction layer firmware. The remote device abstraction layer firmware determines the destination node based on the value of the remote device abstraction layer handle. The remote device abstraction layer firmware then assembles a network message with the data scan information and sends this message to the desired node. Once the remote device abstraction layer firmware portion on the node controller side receives the message, the remote device abstraction layer firmware calls the access device abstraction layer to scan the chip. The result of the data scan will then be sent back in the reverse direction. Each such data scan operation request requires a separate network transaction and some overhead time for the calls between the application and the firmware.

Figure 4:
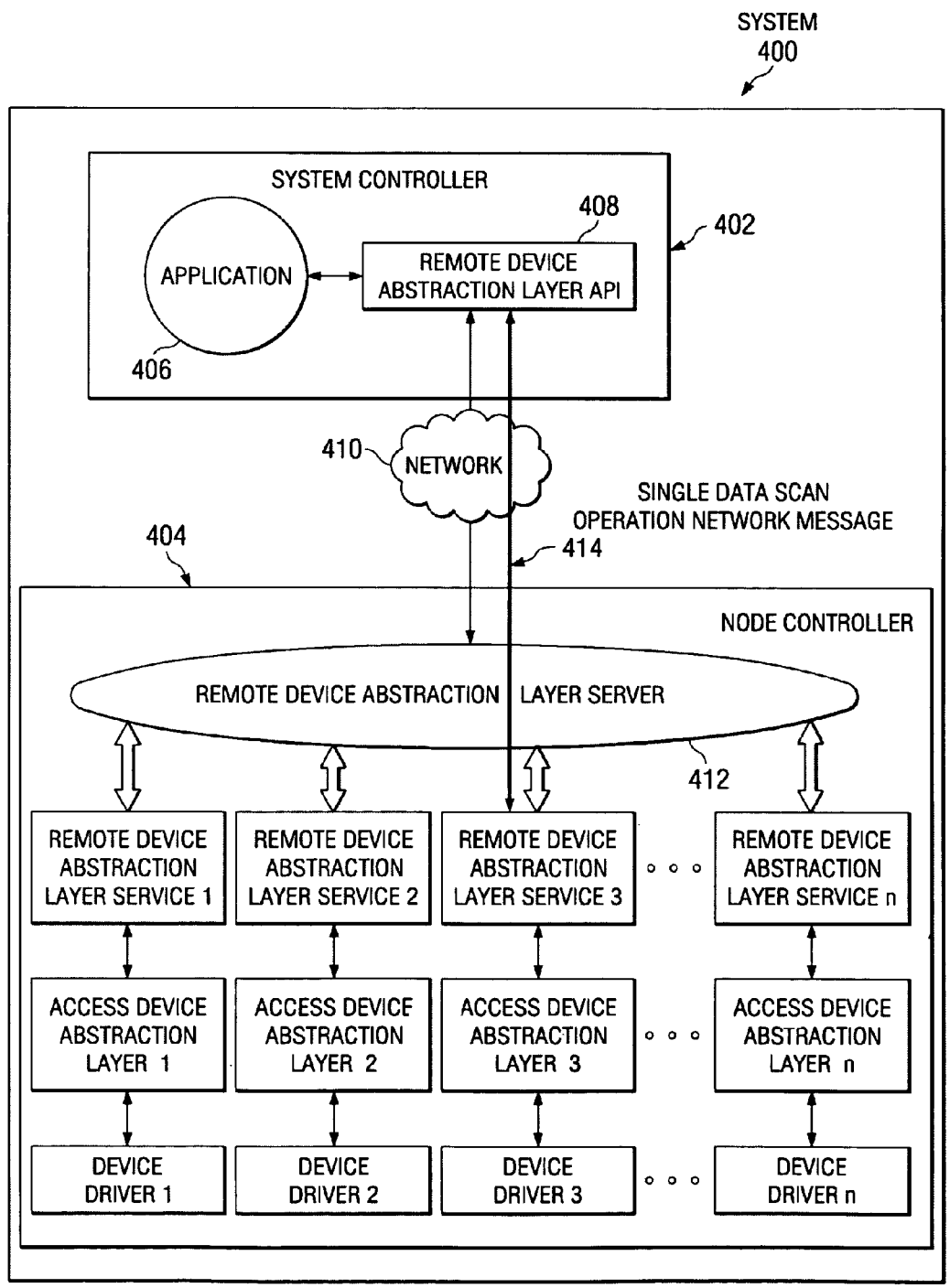
FIG. 4 is a block diagram illustrating data scan operations in accordance with an exemplary embodiment.

FIG. 4 is a block diagram illustrating data scan operations in accordance with an exemplary embodiment. System 400 illustrates a single system controller, system controller 402, and node controller, node controller 404, of a multi-node system, such as system 300 in FIG. 3. System controller 402 may be implemented as a primary system controller, such as primary system controller 306 in FIG. 3. System controller 402 comprises application 406 and remote device abstraction layer application program interface (API) 408. Node controller 404 comprises remote device abstraction layer server 412, remote device abstraction layer service 1 through remote device abstraction layer service n, access device abstraction layer 1 through access device abstraction layer n and device driver 1 through device driver n.

Within node controller 404 all remote device abstraction layer services communicate with remote device abstraction layer server 412 Each remote device abstraction layer service communicates with a corresponding access device abstraction layer, which in turn communicates with a corresponding device driver for a physical device. Each device driver controls a physical device on the node.

Remote device abstraction layer API 408 communicates with node controller 404 through network 410. Remote device abstraction layer API 408 sends a single data scan operation network message, which contains a request to perform a single data scan operation, over network 410 to remote device abstraction layer server 412 in node controller 404.

Remote device abstraction layer API 408 and remote device abstraction layer server 412 are both firmware. On a system controller, the remote device abstraction layer firmware is referred to as the remote device abstraction layer API because the remote device abstraction layer firmware is in the form of a library providing interfaces to be called by other firmware applications. On a node controller, the remote device abstraction layer firmware is referred to as the remote device abstraction layer server because the remote device abstraction layer firmware runs as an independent process. This process runs indefinitely, continually looking for a remote device abstraction layer message coming from the network and executing the message. Thus, the remote device abstraction layer firmware on the node controller is referred to as the remote device abstraction layer server.

Remote device abstraction layer server 412 passes the received message to the proper remote device abstraction layer service that will communicate with the device driver that controls the physical device in order to scan in or out the data that is the subject of the data scan operation. Single data scan operation network message 414 is an example of one such data scan request.

During a system initial program load, applications initialize the chips on node by sequentially scanning data in/out of the chips according to pre-defined hardware procedures. Exemplary embodiments take advantage of this sequential characteristic by packaging multiple data scan operation requests and responses into one operation that requests only one network message, thus eliminates unnecessary network overhead, network traffic, network connection errors, and code latency. Exemplary embodiments provide many benefits. Exemplary embodiments improve data scan performance and reduce initial program load time of a high-end server system, such as system 300 in FIG. 3. Exemplary embodiments eliminate network overhead caused by many small data scan operation network messages. Exemplary embodiments eliminate repeated code latency caused by many single data scan calls from applications to remote device abstraction layer firmware. Exemplary embodiments reduce system-node controller network traffic, thus allowing the network to be used for other operations more efficiently. Exemplary embodiments reduce device/system call intermittent errors due to network failures by reducing network traffics. Exemplary embodiments are compatible with existing system methodologies and structures.

Exemplary embodiments provide an interface in hardware object model firmware that allows applications to request multiple data scan operations at once. The interface allows applications to sequentially fill in a list of desired scan operations that are then sent to the desired node in one network message. The portion of remote device abstraction layer firmware running on a node then calls the access device abstraction layer to perform all the scan operations according to the list, pack and send back the results to the system controller that sent the packed request, all in one network transaction.

Figure 5:
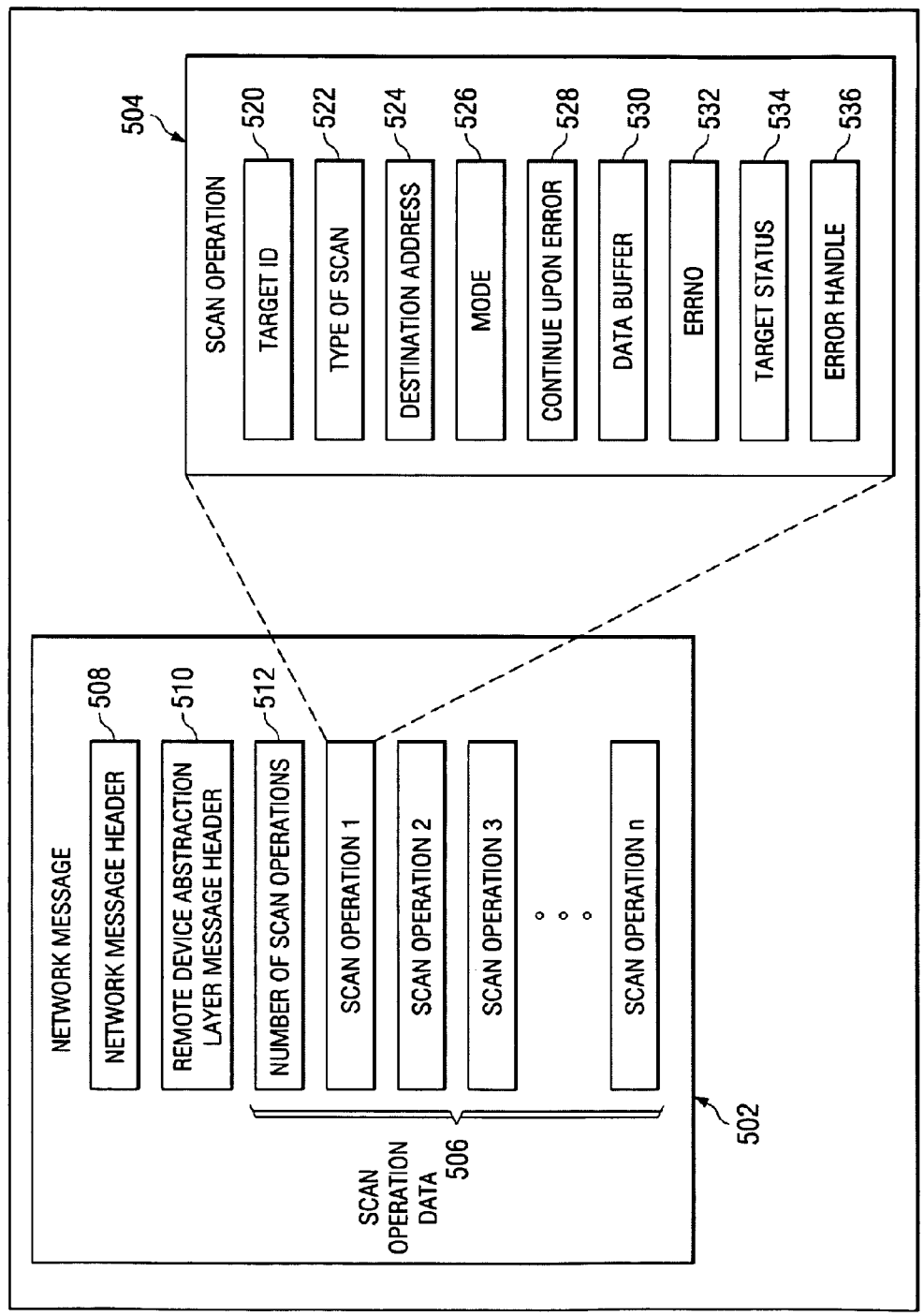
FIG. 5 is block diagram of a compacted data scan operation network message in accordance with an exemplary embodiment.

FIG. 5 is block diagram of a compacted data scan operation network message in accordance with an exemplary embodiment. Network message 502 is an illustrative embodiment of a compacted data scan operation network message comprised of multiple data scan operations. Network message 502 comprises network message header 508, remote device abstraction layer message header 510, and scan operation data 506. Scan operation data 506 comprises number of scan operations 512 and the collected data scan operations, scan operation 1 through scan operation n. Any number of individual scan operations may be compacted and contained within scan operation data 506.

Network message header 508 contains data that is only visible to the network layer. Remote device abstraction layer message header 510 and scan operation data 506 consist of fields that are only visible to remote device abstraction layer firmware that resides on the system controller and node controller, such as remote device abstraction layer API 406 and remote device abstraction layer server 412 in FIG. 4. Number of scan operations 512 is a field that contains the number of device operations in network message 502. Scan operation 1 through scan operation n contains device operation data. The device operation data contains the data scan operations that will be sent to the access device abstraction layer to access the devices.

Scan operation 504 is an exploded view of scan operation 1. Each scan operation in the plurality of scan operations in scan operation data 506 is an object or structure that contains input/output information for the individual scan operation. Scan operation 504 is an exploded view of scan operation 1 in scan operation data 506. Scan operation 504 comprises input/output fields target id 520, type of scan 522, destination address 524, mode 526, continue upon error 528, data buffer 530, errno 532, target status 534, and error handle 536. Scan operation 504 is one exemplary embodiment of input and output fields of a scan operation. Other exemplary embodiments comprise scan operations that include less or more input and out put fields.

The individual scan operations, such as scan operation 504, are built, or generated, based on information contained in a plurality of request to perform a data scan operation collected by a message packer in the remote device abstract abstraction layer API. Target id 520 is an input field containing the identification of the hardware that the scan operation targets. The hardware is either a chip or functional unit with a central electronics complex, such central electronics complex 314 in FIG. 3. Type of scan 522 is an input field specifying the type of data scan operations to be performed. Destination address 524 is the absolute value of the location in the target chip/functional unit to scan the data from or to. Mode 526 is an input field that includes the hardware object model firmware mode of operation, which tells the hardware object model firmware the desired options for this scan operation, including any special handling instructions. Continue upon error 528 is an input field. Continue upon error 528 tells whether to continue to the next scan in the sequence if current scan encounters an error. Continue upon error 528 is set to either true or false. Data buffer 530 is a both an input and an output field. Data buffer 530 is the location to which scanned data is written or the location from which data to be scanned into the target is read from. Errno 532 is an output field. This field is initialized to 0xFFF by hardware object model firmware before performing multi-scan process. Errno 532 stores the result of the scan in terms of a system error occurring or no system error occurring. Target status 534 is an output field. Target status 534 includes the SCOM status register of the target chip or functional unit after the scan operation completes. Error handle 536 is an output field. Error handle 536 contains the specific error handle for an error that occurred specifically for this scan operation. The error may or may not be a system error and therefore the error handle in error handle 536 may or may not be related to any system error in errno 532.

Figure 6:
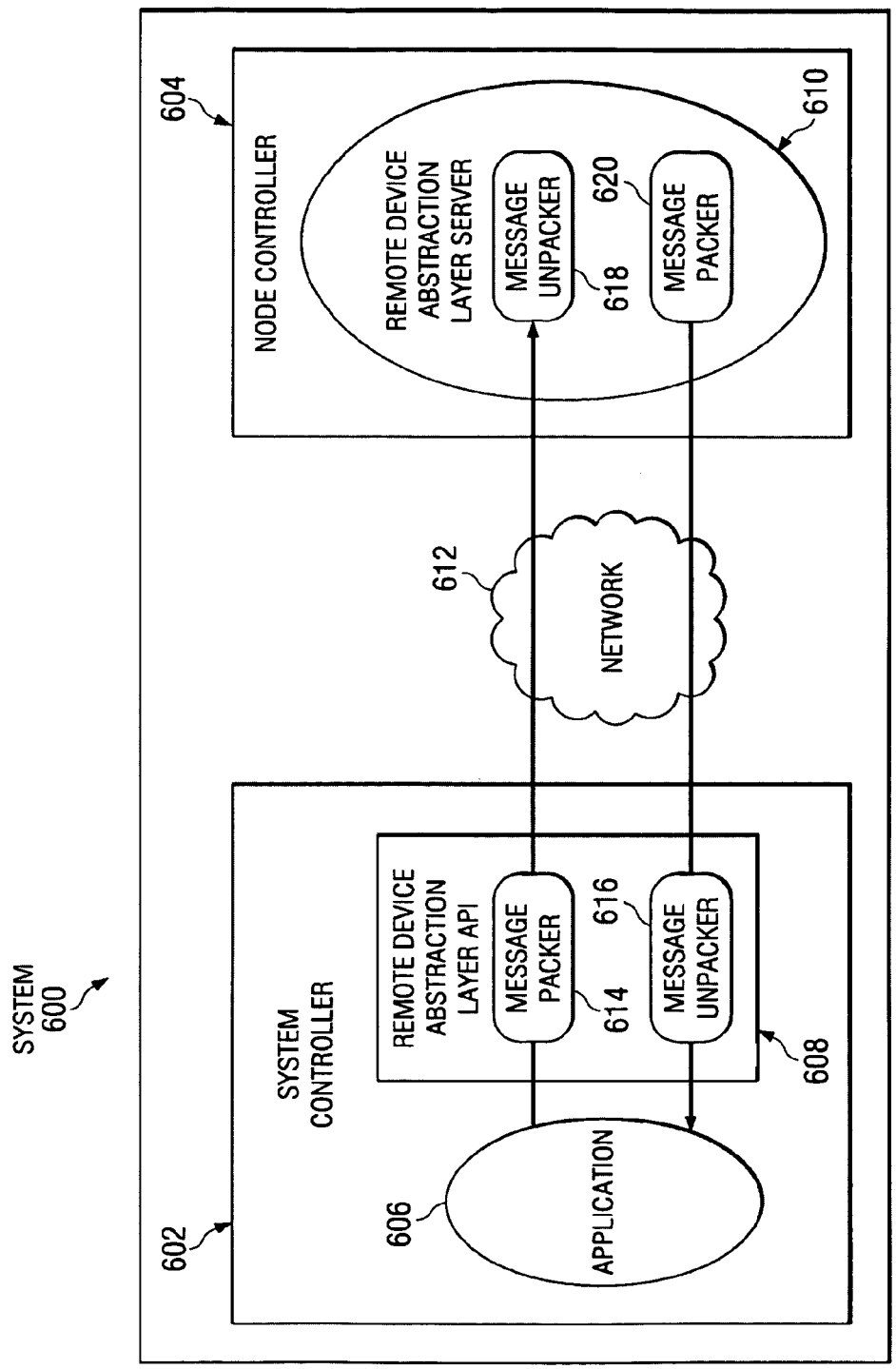
FIG. 6 is a block diagram illustrating packing and unpacking multiple scans according to an exemplary embodiment.

FIG. 6 is a block diagram illustrating packing and unpacking multiple scans according to an exemplary embodiment. System 600 illustrates a single system controller, system controller 602, a node controller, node controller 604, of a multi-node system, such as system 300 in FIG. 3, and network 612, which may be implemented as network 102 in FIG. 1. System controller 602 may be implemented as a primary system controller, such as primary system controller 306 in FIG. 3. System controller 602 comprises application 606 and remote device abstraction layer application program interface (API) 608. Node controller 604 comprises remote device abstraction layer server 610. Node controller 604 and system controller 602 communicate over network 612.

Remote device abstraction layer API 608 comprises message packer 614 and message unpacker 616. Remote device abstraction layer server 610 comprises message packer 620 and message unpacker 618. Thus, when application 606 sends multiple data scan operation requests, which are request to perform a data scan operation on a remote node controller, to remote device abstraction layer API 608, message packer 614 collects and packs the multiple data scan operations into a single network message, referred to as a compacted data scan operation network message, such as network message 502 in FIG. 5. The individual scan operations of the compacted data scan operation network message, such as scan operation 504 in FIG. 5, are generated based on information contained in the multiple data scan operation requests received and collected by message packer 614. Remote device abstraction layer API 608 sends the packed message to remote device abstraction layer server 610, where message unpacker 618, unpacks the message. The individual data scan operations are carried out on node controller 604. Message packer 620 of remote device abstraction layer server 610 collects the results of the individual data scan operations and packs them into a single network message, such as network message 502 in FIG. 5. Remote device abstraction layer server 610 sends the packed message to remote device abstraction layer API 608, where message unpacker 616, unpacks the single packed network message, and sends the individual data scan operation results to application 606.

Figure 7:
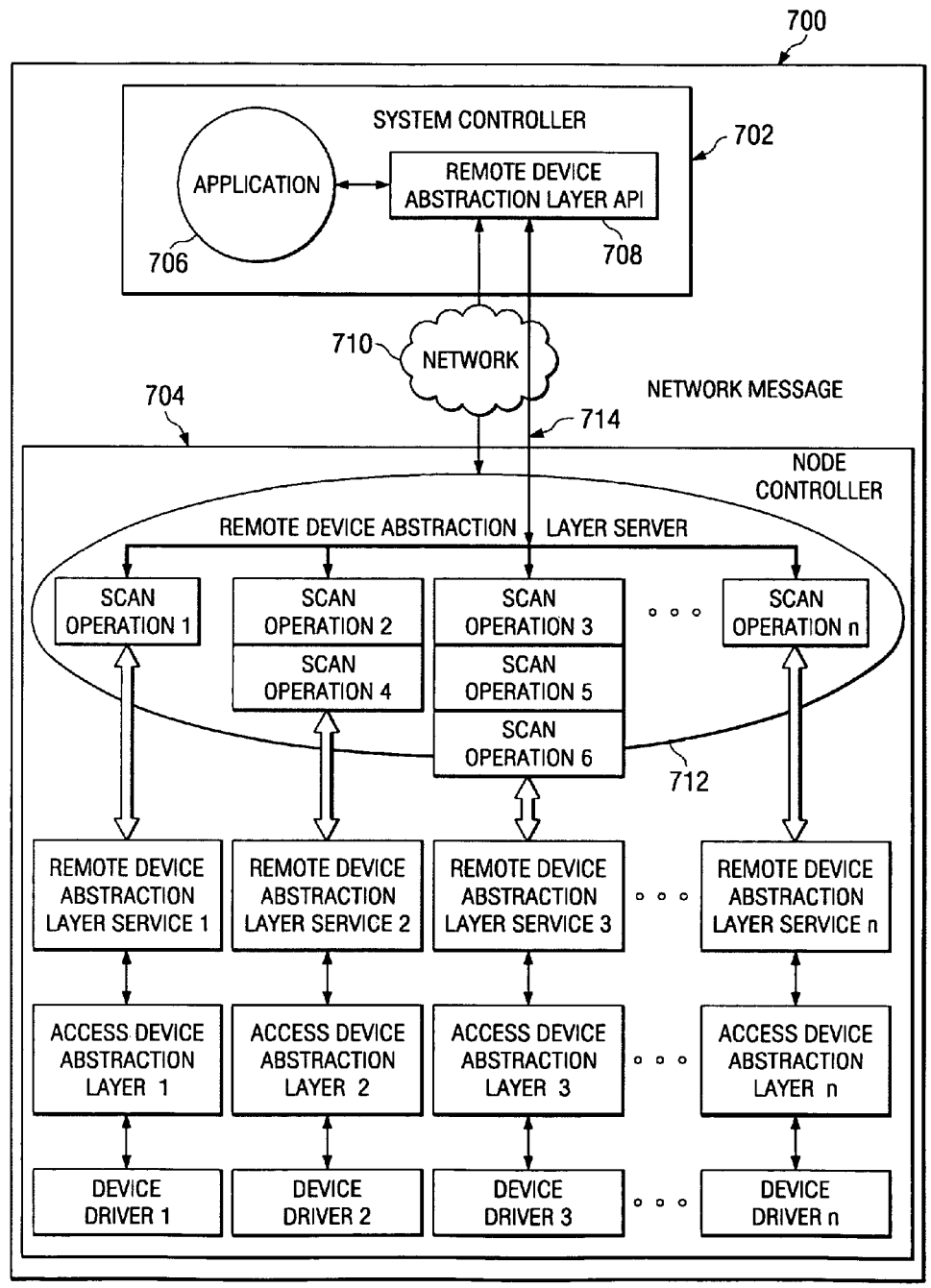
FIG. 7 is a block diagram illustrating data scan operations in accordance with an exemplary embodiment.

FIG. 7 is a block diagram illustrating data scan operations in accordance with an exemplary embodiment. System 700 illustrates a single system controller, system controller 702, and a single node controller, node controller 704, of a multi-node system, such as system 300 in FIG. 3. System controller 702 may be implemented as a primary system controller, such as primary system controller 306 in FIG. 3. System controller 702 comprises application 706 and remote device abstraction layer application program interface (API) 708. Node controller 704 comprises remote device abstraction layer server 712, remote device abstraction layer service 1 through remote device abstraction layer service n, access device abstraction layer 1 through access device abstraction layer n and device driver 1 through device driver n.

Within node controller 704 all remote device abstraction layer services communicate with remote device abstraction layer server 712 Each remote device abstraction layer service communicates with a corresponding access device abstraction layer, which in turn communicates with a corresponding device driver for a physical device. Each device driver controls a physical device on the node, such as a processor, chipset, or functional unit within the central electronics complex, such as central electronics complex 314 in FIG. 3.

Remote device abstraction layer API 708 communicates with node controller 704 through network 710. Remote device abstraction layer API 708 sends network message 714 over network 710 to remote device abstraction layer server 712 in node controller 704. Network message 714 comprises a set of generated data scan operations packed into a single network message, referred to as a compacted data scan operation network message, such as network message 502 in FIG. 5. The individual data scan operations of the compacted data scan operation network message, such as scan operation 504 in FIG. 5, are generated based on the information contained in the multiple data scan operation requests received by message packer 614 of FIG. 6.

Remote device abstraction layer server 712 passes the received message to the proper remote device abstraction layer service that will communicate with the device driver that controls the physical device in order to scan in or out the data that is the subject of the data scan operation. Remote device abstraction layer API 708 sends network message 714 to remote device abstraction layer server 712. A message unpacker in remote device abstraction layer server 712 unpacks network message 714 into individual scan operations, scan operation 1 though scan operation n.

Individual data scan operations are assigned to the remote device abstraction layer that corresponds to the device identified in the target identification field of each data scan operation. Multiple scan operation may be assigned to the same remote device abstraction layer. Scan operation 1 is assigned to and communicates with remote device abstraction layer 1, which in turn communicates with device driver 1 through access device layer 1. Scan operations 2 and 4 are both assigned to remote device abstraction layer 2. Scan operations 3, 5, and 6 are both assigned to remote device abstraction layer 3. The remote device abstraction layer communicates with the first data scan operation in the queue. Thus, remote device abstraction layer 2 would first communicate with scan operation 4, complete the task of scan operation 4 and then move on to process the data scan operation of scan operation 2.

Once all the data scan operations have been completed, remote device abstraction layer server 712 collects the completed data scan operations, packs them together into a single network message and returns the message to remote device abstraction layer API 708, where the message is unpacked and the individual data scan operations are communicated to the application that issued them.

Figure 8:
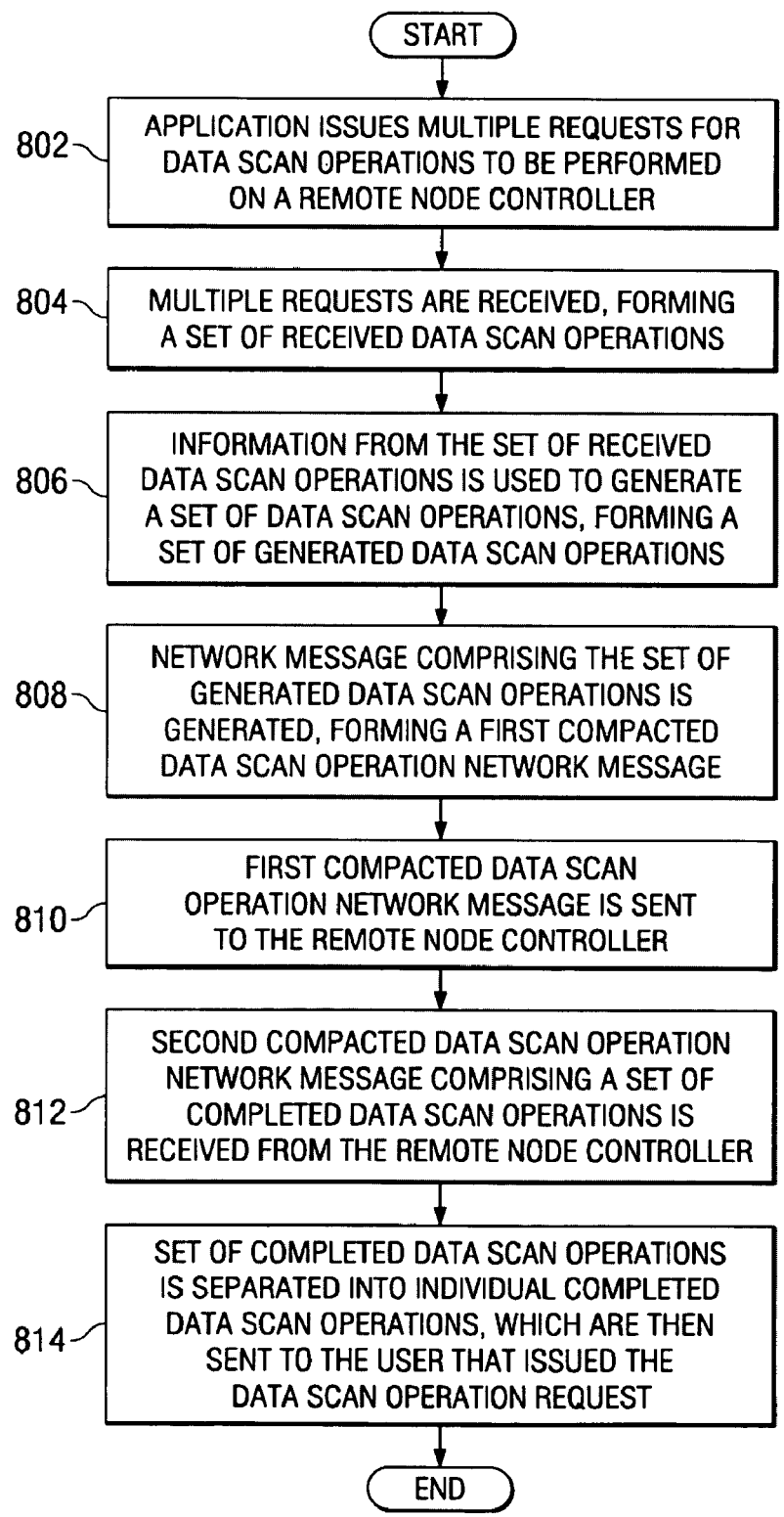
FIG. 8 is a flowchart illustrating the operation of generating a compacted network message in accordance with an exemplary embodiment.

FIG. 8 is a flowchart illustrating the operation of generating a compacted network message in accordance with an exemplary embodiment. The operation of FIG. 8 may be implemented in a system controller, such as system controller 602 in FIG. 6 and more specifically in remote device abstraction layer API 608 of FIG. 6. The operation begins when an application issues multiple requests for data scan operations to be performed on a remote node controller (step 802). The multiple requests are received, forming a set of received data scan operations (step 804). The set of received data scan operations are received and collected by a message packer, such as message packer 614 in FIG. 6. Information from the set of received data scan operations is used to generate a set of data scan operations, forming a set of generated data scan operations (step 806). A network message comprising the set of generated data scan operations is generated, forming a first compacted data scan operation network message (step 808). The first compacted data scan operation network message is sent to the remote node controller (step 810). A second compacted data scan operation network message comprising a set of completed data scan operations is received from the remote node controller (step 812). The set of completed data scan operations is separated into individual completed data scan operations, which are then sent to the user that issued the data scan operation request (step 814), and the operation ends.

Figure 9:
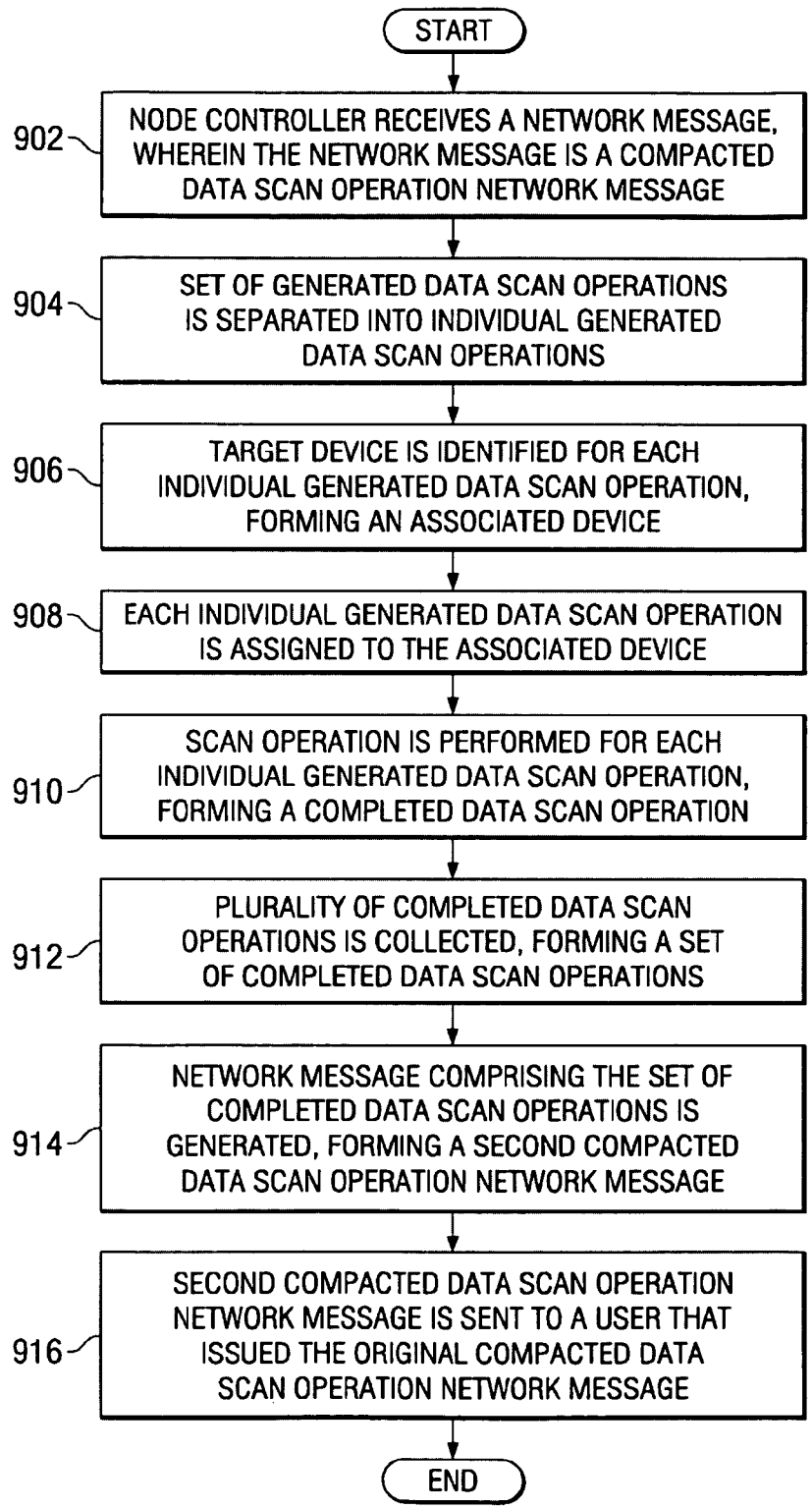
FIG. 9 is a flowchart illustrating the operation of servicing a compacted network message in accordance with an exemplary embodiment.

FIG. 9 is a flowchart that illustrates the operation of servicing a compacted network message in accordance with an exemplary embodiment. The operation of FIG. 9 may be implemented in a node controller, such as node controller 604 in FIG. 6 and more specifically in remote device abstraction layer server 610 of FIG. 6. The operation begins when a node controller receives a network message, wherein the network message is a compacted data scan operation network message, such as network message 502 in FIG. 5, comprising a set of generated data scan operations (step 902). The set of generated data scan operations is separated into individual generated data scan operations (step 904). A target device is identified for each individual generated data scan operation, forming an associated device (step 906) Each individual generated data scan operation is assigned to the associated device (step 908). A scan operation is performed for each individual generated data scan operation, forming a completed data scan operation (step 910). A plurality of completed data scan operations is collected, forming a set of completed data scan operations (step 912). A network message comprising the set of completed data scan operations is generated, forming a second compacted data scan operation network message (step 914). The second compacted data scan operation network message is sent to a user that issued the original compacted data scan operation network message (step 916), and the operation ends.

Thus, exemplary embodiments provide an interface in hardware object model firmware that allows applications to request multiple data scan operations at once. The interface allows applications to sequentially fill in a list of desired scan operations that are then sent to the desired node in one network message. The portion of remote device abstraction layer firmware running on a node then calls the access device abstraction layer to perform all the scan operations according to the list, pack and send back the results to the system controller that sent the packed request, all in one network transaction. Exemplary embodiments improve data scan performance and reduce initial program load time of a high-end server system. Exemplary embodiments eliminate network overhead caused by many small data scan operation network messages. Exemplary embodiments eliminate repeated code latency caused by many single data scan calls from applications to remote device abstraction layer firmware. Exemplary embodiments reduce system-node controller's network traffic, thus allowing the network to be used for other operations more efficiently. Exemplary embodiments reduce device/system call intermittent errors due to network failures by reducing network traffics.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for compacting multiple data scan operations into a single network message, the computer-implemented method comprising:

receiving, by a system controller or a backup system controller, a plurality of requests to perform a data scan operation on a remote node controller of a plurality of remote node controllers, forming a set of received data scan operation requests for performing initialization and diagnostics of a set of chips in a remote node managed by the remote node controller, or a backup node controller, according to a set of predefined hardware procedures for initializing the set of chips during a time of system initial program load, wherein the backup node controller is used if the remote node controller fails;

managing each remote node controller of a plurality of remote node controllers, by the system controller or the backup system controller, wherein the backup system controller is used if the system controller fails;

determining, by the system controller, if the data scan is allowed based on a current state of each chip of the set of chips; and responsive to determining data scan is allowed, generating a set of data scan operations based on the set of received data scan operation requests, forming a set of generated data scan operations;

generating a network message comprising the set of generated data scan operations, forming a first compacted data scan operation network message;

sending the first compacted data scan operation network message to the remote node controller;

receiving a second compacted data scan operation network message from the remote node controller, wherein the second compacted data scan operation network message comprises a set of completed data scan operations;

separating the set of completed data scan operations into individual completed data scan operations; and sending each individual completed data scan operation to a user that issued a request.

2. The computer-implemented method of claim 1, further comprising:

receiving, at the remote node controller, the compacted data scan operation network message;

separating the set of generated data scan operations into individual generated data scan operations;

identifying a target chip for each individual generated data scan operation, forming an associated target chip;

assigning each individual generated data scan operation to the associated target device chip;

performing the generated data scan operation, forming a completed data scan operation;

collecting a plurality of completed data scan operations, forming the set of completed data scan operations;

generating a network message comprising the set of completed data scan operations, forming the second compacted data scan operation network message; and sending the second compacted data scan operation network message to a requester that send the first compacted data scan operation network message.

3. The computer-implemented method of claim 1, wherein the first compacted data scan operation message comprises a first message header, a second message header, and a data structure, wherein the first message header is a network message header, wherein the second message header is a remote device abstraction layer message header, and wherein the data structure comprises scan operation data.

4. The computer-implemented method of claim 3, wherein the scan operation data comprises a number of scan operations in the set of generated data scan operations and the set of generated data scan operations.

5. The computer-implemented method of claim 4, wherein each generated data scan operation of the set of generated data scan operations comprises a data structure that contains input/output information for the generated data scan operation.

6. The computer-implemented method of claim 5, wherein the data structure of a generated data scan operations comprises:

a first input field comprising an identification of a device that the generated data scan operation targets;

a second input field specifying the type of data scan operation to be performed;

a third input filed comprising an absolute value of a location in the target chip to scan data from or to write the data to;

a fourth input field comprising a hardware object model firmware mode of operation for the generated scan operation, including any special handling instructions;

a fifth input field comprising instructions regarding whether to continue to a next scan in a sequence of scans providing that a current scan encounters an error;

a data buffer for writing the data to or from;

a first output field that stores a result of the generated data scan operation in terms of a system error occurring or no system error occurring;

a second output field comprising a status of the target chip after the generated data scan operation completes; and a third output field comprising a specific error handle for an error that occurred specifically for the generated data scan operation.

7. The computer-implemented method of claim 3, wherein the network message header comprises data that is only visible to a network layer, wherein the remote device abstraction layer message header and the scan operation data comprise fields that are only visible to remote device abstraction layer firmware that resides on a system controller and a node controller.

8. The computer-implemented method of claim 1, wherein the first and second compacted data scan operation network messages are sent over a system-node controller network.

9. A computer program product for compacting multiple data scan operations into a single network message, the computer program product comprising:

a computer readable tangible storage device;

first program instructions for receiving, by a system controller or a backup system controller, a plurality of requests to perform a data scan operation on a remote node controller of a plurality of remote node controllers, forming a set of received data scan operation requests for performing initialization and diagnostics of a set of chips in a remote node managed by the remote node controller, or a backup node controller, according to a set of predefined hardware procedures for initializing the set of chips during a time of system initial program load, wherein the backup node controller is used if the remote node controller fails;

second program instructions for managing each remote node controller of a plurality of remote node controllers, by the system controller or the backup system controller, wherein the backup system controller is used if the system controller fails;

third program instructions for determining, by the system controller, if the data scan is allowed based on a current state of the device each chip of the set of chips; and fourth program instructions for responsive to determining data scan is allowed, generating a set of data scan operations based on the set of received data scan operation requests, forming a set of generated data scan operations;

fifth program instructions for generating a network message comprising the set of generated data scan operations, forming a first compacted data scan operation network message;

sixth program instructions for sending the first compacted data scan operation network message to the remote node controller;

seventh program instructions for receiving a second compacted data scan operation network message from the remote node controller, wherein the second compacted data scan operation network message comprises a set of completed data scan operations;

eighth program instructions for separating the set of completed data scan operations into individual completed data scan operations; and ninth program instructions for sending each individual completed data scan operation to a user that issued a request;

wherein the first through the ninth program instructions are stored in the computer readable tangible storage device.

10. The computer program product of claim 9, further comprising:

tenth program instructions for receiving, at the remote node controller, the compacted data scan operation network message;

eleventh program instructions for separating the set of generated data scan operations into individual generated data scan operations;

twelfth program instructions for identifying a target chip for each individual generated data scan operation, forming an associated target chip;

thirteenth program instructions for assigning each individual generated data scan operation to the associated target chip;

fourteenth program instructions for performing the generated data scan operation, forming a completed data scan operation;

fifteenth program instructions collecting a plurality of completed data scan operations, forming the set of completed data scan operations;

sixteenth program instructions generating a network message comprising the set of completed data scan operations, forming the second compacted data scan operation network message; and seventeenth program instructions sending the second compacted data scan operation network message to a requester that send the first compacted data scan operation network message;

wherein the tenth through the seventeenth program instructions are stored in the computer readable tangible storage device.

11. The computer program product of claim 9, wherein the first compacted data scan operation message comprises a first message header, a second message header, and a data structure, wherein the first message header is a network message header, wherein the second message header is a remote device abstraction layer message header, and wherein the data structure comprises scan operation data.

12. The computer program product of claim 11, wherein the scan operation data comprises a number of scan operations in the set of generated data scan operations and the set of generated data scan operations.

13. The computer program product of claim 12, wherein each generated data scan operation of the set of generated data scan operations comprises a data structure that contains input/output information for the generated data scan operation.

14. The computer program product of claim 13, wherein the data structure of a generated data scan operations comprises a first input field comprising an identification of a device that the generated data scan operation targets;

a second input field specifying the type of data scan operation to be performed;

a third input filed comprising an absolute value of a location in the target chip to scan data from or to write the data to;

a fourth input field comprising a hardware object model firmware mode of operation for the generated scan operation, including any special handling instructions;

a fifth input field comprising instructions regarding whether to continue to a next scan in a sequence of scans providing that a current scan encounters an error;

a data buffer for writing the data to or from;

a first output field that stores a result of the generated data scan operation in terms of a system error occurring or no system error occurring;

a second output field comprising a status of the target chip after the generated data scan operation completes; and a third output field comprising a specific error handle for an error that occurred specifically for the generated data scan operation.

15. The computer program product of claim 12, wherein the network message header comprises data that is only visible to a network layer, wherein the remote device abstraction layer message header and the scan operation data comprise fields that are only visible to remote device abstraction layer firmware that resides on a system controller and a node controller.

16. The computer program product of claim 9, wherein the first and second compacted data scan operation network messages are sent over a system-node controller network.

17. A data processing system for compacting multiple data scan operations into a single network message, the data processing system comprising:

a bus;

a memory connected to the bus, wherein the memory contains a set of instructions;

a plurality of processors connected to the bus, wherein the plurality of processors executes the set of instructions to:

receive, by a system controller or a backup system controller, a plurality of requests to perform a data scan operation on a remote node controller of a plurality of remote node controllers, forming a set of received data scan operation requests for performing initialization and diagnostics of set of chips in a remote node managed by the remote node controller, or a backup node controller, according to a set of predefined hardware procedures for initializing the set of chips during a time of system initial program load, wherein the backup node controller is used if the remote node controller fails;

manage each remote node controller of a plurality of remote node controllers, by the system controller or the backup system controller, wherein the backup system controller is used if the system controller fails;

determine, by the system controller, if the data scan is allowed based on a current state of each chip of the set of chips; and responsive to determining data scan is allowed, generate a set of data scan operations based on the set of received data scan operation requests, forming a set of generated data scan operations;

generate a network message comprising the set of generated data scan operations, forming a first compacted data scan operation network message; send the first compacted data scan operation network message to the remote node controller; receive a second compacted data scan operation network message from the remote node controller, wherein the second compacted data scan operation network message comprises a set of completed data scan operations;

separate the set of completed data scan operations into individual completed data scan operations; and send each individual completed data scan operation to a user that issued a request.

18. The data processing system of claim 17, wherein the processor further executes the set of instructions to receive, at the remote node controller, the compacted data scan operation network message; separate the set of generated data scan operations into individual generated data scan operations; identify a target chip for each individual generated data scan operation, forming an associated target chip; assign each individual generated data scan operation to the associated target chip; perform the generated data scan operation, forming a completed data scan operation; collect a plurality of completed data scan operations, forming the set of completed data scan operations; generate a network message comprising the set of completed data scan operations, forming the second compacted data scan operation network message; and send the second compacted data scan operation network message to a requester that sent the first compacted data scan operation network message.

19. The data processing system of claim 17, wherein the first compacted data scan operation message comprises a first message header, a second message header, and a data structure, wherein the first message header is a network message header, wherein the second message header is a remote device abstraction layer message header, and wherein the data structure comprises scan operation data.

20. The data processing system of claim 19, wherein the scan operation data comprises a number of scan operations in the set of generated data scan operations and the set of generated data scan operations.

* * * * *